Sept. 30, 1952 A. R. NEWELL 2,612,233
SHROUD SUPPORTING FRAME FOR AUTOMOBILE ENGINE COMPARTMENTS
Filed May 20, 1948 3 Sheets-Sheet 1
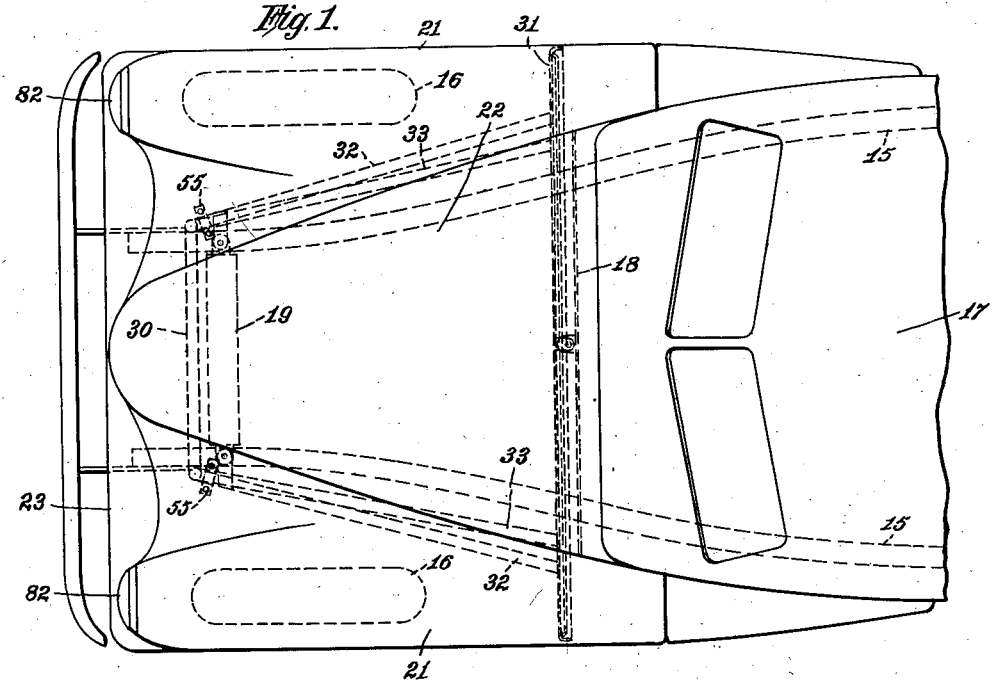
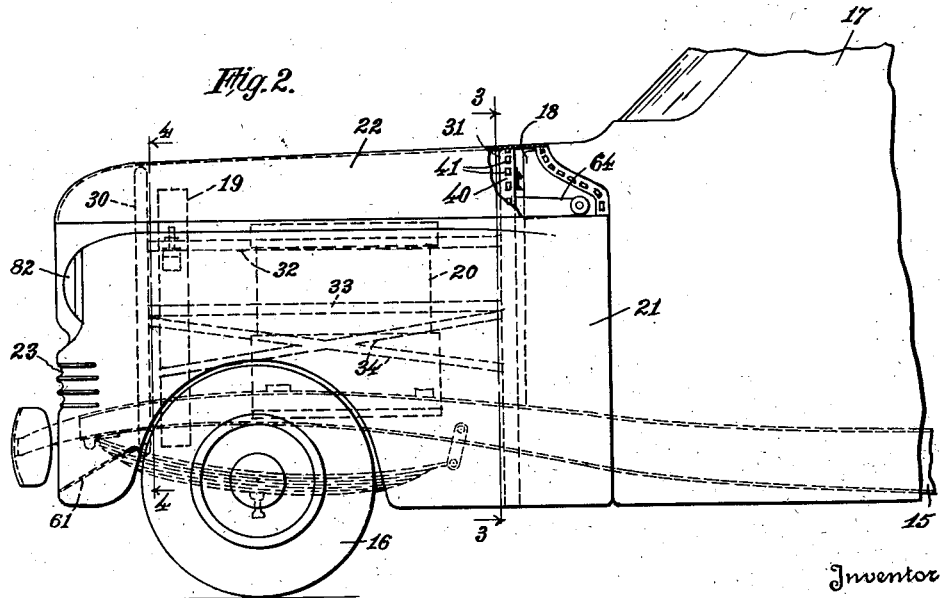
Inventor
Arthur R. Newell Sept. 30, 1952. A. R. NEWELL 2,612,233
SHROUD SUPPORTING FRAME FOR AUTOMOBILE ENGINE COMPARTMENTS
Filed May 20, 1948 3 Sheets-Sheet 2
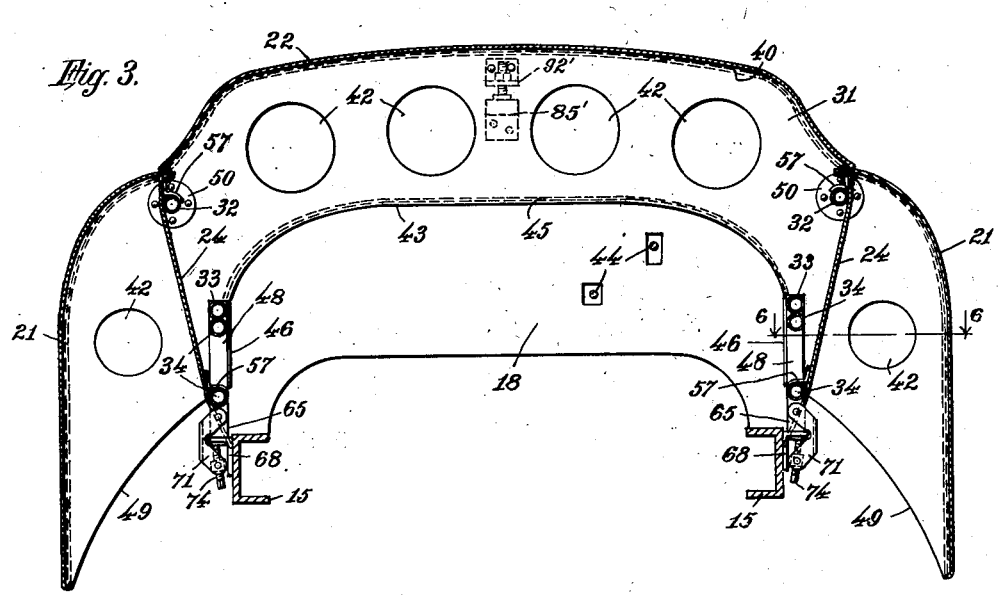
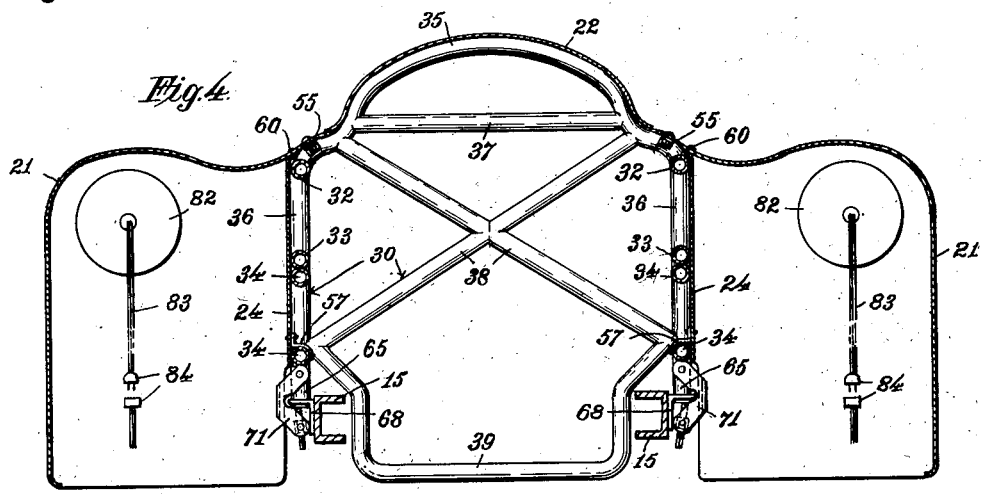
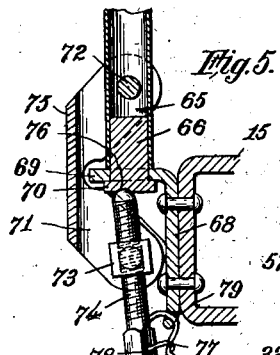
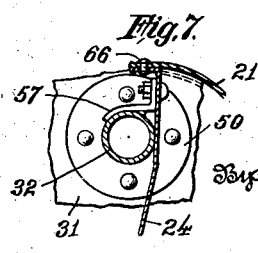
Inventor
Arthur R. Newell
By
Attorney

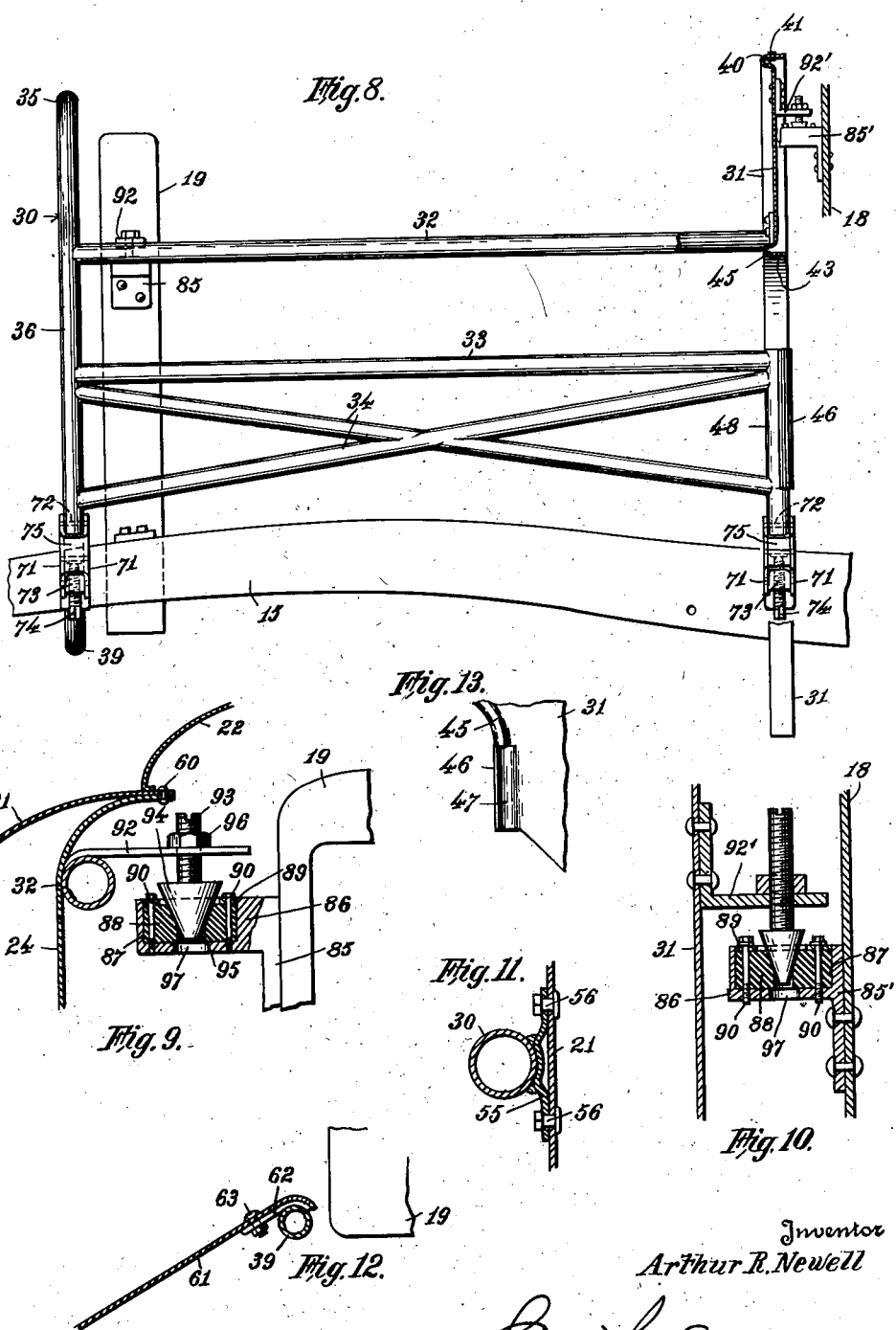

Patented Sept. 30, 1952

2,612,233

UNITED STATES PATENT OFFICE 2,612,233

SHROUD SUPPORTING FRAME FOR AUTOMOBILE ENGINE COMPARTMENTS

Arthur R. Newell, Topeka, Kans.

Application May 20, 1948, Serial No. 28,072

7 Claims. (Cl. 180—89)

This invention relates to motor vehicles, and particularly to an improved construction of the shrouding assembly whereby access may be readily had to the motor, front axle and other operative parts which lie forwardly of the dash-board.

In the present type of construction of automobiles, the fenders, splash aprons, radiator grill, and hood are connected directly to the chassis and body of the car and to each other by numerous bolts or/and other fastening means. With such construction the only provision affording ready access to the motor and adjacent parts for adjustment or repair is the hinged hood; but this, at best, provides only cramped quarters for work on the motor etc.; and frequently it is impossible to reach or work upon the necessary parts.

Under such conditions it becomes necessary to remove one or both front wheels, and the splash aprons, which consumes much time and requires the use of costly tools both for the removal and the replacement thereof.

The object of the present invention is to provide in an automobile an improved construction whereby the hood, fenders, splash aprons and other parts enclosing the motor, and usually designated as the shrouding, may be readily and quickly removed in order to give unhampered access to the parts requiring repair or adjustment.

An additional advantage of this sub-frame assembly is that in case of necessary repair a completed assembly could be loaned and installed immediately and the car used by the owner while the damaged part is being repaired, thus permitting the use of the car during the period of repair.

A further object of the invention is to provide a construction as above mentioned in which the several parts may be removed and replaced as a unit.

A further object of the invention is to provide novel means for firmly, but releasably securing the unitary assembly in normal position.

A further object of the invention is to provide novel vibration dampeners between the removable unit and the fixed portions of the automobile.

Other objects will appear hereinafter.

With these objects in view, the invention comprises a shroud supporting frame to which the cowl consisting of the hood, fenders, and aprons are securely fastened, and means for detachably connecting the shroud supporting frame to the main frame or chassis of an automobile.

The invention further and more specifically consists in a device as above stated in which the frame comprises front and rear transverse frame portions, and longitudinal members rigidly connecting said transverse members, and means securely connecting the fenders and aprons to adjacent portions of the shroud supporting frame.

The invention further consists in a device as above stated in which the transverse members are provided at the lower outer portions with sockets to receive upwardly extending pins or studs rigidly fixed to the automobile frame, and clamps for securing said sockets on said pins.

The invention further consists in various combinations and arrangement of parts as will be described hereinafter and particularly pointed out in the claims.

The invention will be more readily understood by reference to the accompanying drawings forming a part of this specification, and in which:

Figure 1 is a plan view of the forward portion of an automobile embodying the present invention;

Figure 2 is a side elevation of the same, parts being broken away;

Figure 3 is a section on substantially the line 3—3 of Figure 2, upon an enlarged scale, and particularly illustrating the rear transverse member of the shroud supporting frame.

Figure 4 is a section on substantially the line 4—4 of Figure 2, illustrating particularly the front transverse member;

Figure 5 is a detail sectional view of one of the clamps for securing the removable unit to the main frame, and illustrated upon a much enlarged scale;

Figure 6 is a detail section on the line 6—6 of Figure 3;

Figure 7 is a detail of a preferred means for attaching certain of the longitudinal elements of the frame to the rear cross element, and illustrated upon an enlarged scale;

Figure 8 is a side elevation, partly in section of the shroud supporting frame, with the fenders, aprons, hood and radiator grill removed;

Figure 9 is a sectional detail of a vibration dampener such as used between the radiator and adjacent portions of the removable unit;

Figure 10 is a similar view of the vibration dampener as used between the rear transverse element of the shroud supporting frame and the dash-board;

Figure 11 is a detail view of means for connecting portions of the aprons and/or fenders to the adjacent portions of the shroud supporting frame.

Figure 12 is a detail view of the manner of connecting the shield plate below and forwardly of the radiator to direct air to the same;

Figure 13 is a detail of a portion of the rear transverse member.

Referring to the drawings, 15—15 indicates the longitudinal main frame members of an automobile chassis, which are curved inwardly at the forward portion in the customary manner to provide clearance for the front wheels 16. The body 17 of the automobile includes the usual dashboard 18; and a radiator 19 is mounted upon the frame members 15. Intermediate the radiator 19 and dash-board 18 is the engine or motor 20 which is also fixed to the frame members 15. These elements and their arrangement are common to all automobiles in general use.

The front fenders 21 and hood 22 may be of any desired contour, as also may be the radiator grill assembly 23. Splash aprons 24 are provided, dividing the engine space under the hood 22 from the wheel space under the fenders 21. It is the usual practice to rivet, bolt, or otherwise secure the fenders 21, splash aprons 24, and radiator grill assembly 23 directly to each other and to the frame members 15; and to hinge the hood 22 to the body 17 of the car adjacent the dashboard. As hereinbefore stated, it is frequently necessary to remove one or both of the front wheels 16, the fenders 21 and aprons 24, and sometimes the grill assembly 23, in order to reach and work upon the parts needing adjustment or repair; and as these elements are secured in permanent position by numerous bolts, rivets or other fastening means, the removal and replacement thereof requires considerable time and the use of expensive tools.

The main object of this invention is to provide a construction and assembly of parts whereby the shrouding consisting of the sheet metal parts covering the engine and radiator and comprising the hood, fenders, aprons and radiator grill, may be quickly removed to give unhampered access to the engine, front axle, and adjacent parts, and as readily replaced and secured in position, and without the use of special tools.

To this end a shrouding frame is provided to which the shrouding elements are fixed, forming therewith a unitary structure which may be readily attached to the frame members 18 of the chassis and as readily detached therefrom.

The shrouding frame above mentioned comprises generally front and rear transverse members 30 and 31 respectively, and longitudinal connecting members 32, 33 and 34.

The front frame member 30 is preferably made entirely of tubular stock, and comprises a top portion 35 which is curved or shaped to conform to the contour of the adjacent portion of hood 22, and vertical side portions 36—36 together with suitable brace bars, such as shown at 37, 38 and 39, whch are welded in place to form a rigid frame element. Although a specific form is illustrated, it is to be understood that the shape of the member 30 may be varied to conform to the design of the automobile.

The rear frame member 31 is formed of pressed steel plate and its upper edge is shaped to conform to the contour of the adjacent portion of the hood 22, and then continued outwardly and downwardly conforming to the contour of the adjacent portions of the fenders 21. The upper edge is formed with a reverse flange 40 to add rigidity to the member, and is perforated to receive lacings 41 upon which the hood 22 rests. Portions of the plate may be removed as indicated by the holes 42 to lighten the weight; the size, number and location of the holes being designed according to the gauge of the material and the discretion of the designer.

The lower edge 43 of the transverse member 31 is arched as illustrated in Figures 3 and 8 to permit the engine controls 44, which extend through the dash 18, to pass under the member 31 instead of through the same, so as not to interfere with the removal of the unit. The engine controls 44 are indicated diagrammatically only in Figure 3, which is ample to illustrate the invention as claimed. The arched lower edge 43 is formed with a stiffening reverse flange 45 which spans the frame 15. The edge then extends vertically downwardly, the flanged edge thereof, upon each side, being pressed to form a semi-cylindrical portion 46 forming a vertical recess 47, as illustrated in Figures 6 and 13, into which is welded or otherwise secured a vertical tubular socket member 48 to which the longitudinal members 33 and 34 of the frame are attached. From the lower end of the portion 46, the bottom edge of the transverse member 31 curves outwardly and downwardly as at 49 to the lower edge of the fenders 21.

The connecting members 32, 33 and 34 are preferably tubular and are welded or otherwise secured at the forward ends to the front transverse member 30; and the rear ends of members 33 and 34 are similarly secured to the socket members 48. To the rear ends of the upper longitudinal members 32 are welded flanges 50 which are riveted or otherwise secured to the transverse rear member 31.

The fenders, aprons, and radiator grill are securely attached directly and solely to the shrouding frame above described by any suitable means. In Figure 11 is illustrated a clip for this purpose which comprises a metal strip 55 welded to a frame member, as 39, and bolted to a fender 21 as by bolts 56. This connection is also illustrated at 55 in Figure 4. It is obvious that the clips 55 may be used at any desired places where the fenders, aprons or grill are in proximity to the shrouding frame. The location and number of said clips which are used depends upon the type or design of the car, the essential feature being the fixed connection of said parts to the shrouding frame to form a unitary, removable unit. In Figures 3, 4 and 7 is illustrated a different form of clip which may be employed, especially for securing the splash aprons 24 in position. This comprises a hook-shaped strip 57 welded to the upper face of a longitudinal frame member 32—34 and having an upturned end 58 bolted to the apron. These may be applied where desired to hold the aprons rigidly in place. The adjacent upper longitudinal edges of the fenders and aprons are riveted together as indicated at 69.

The radiator grill 23 may be secured to the frame 30 by either of the clips above described or by any other means, and connected to the fenders in any desired manner; or it may be formed integrally with the fenders, as the specific construction of these parts is not per se, essential to the invention. Included in the radiator grill assembly 23 is the usual air scoop 61, which may also be secured to the shrouding frame by a clip or clips 62 welded to the lower member 39 of the front transverse frame member, and to which the scoop 61 is attached by one or more bolts 63. See Figure 12.

The hood is provided with the usual hinge member 64, which is connected to the rear transverse member 31 of the removable frame instead of to the body portion of the automobile as is the usual practice. By this arrangement the hood becomes part of the unitary removable structure.

The invention consists primarily in the combination of the shrouding frame and associated parts as above described, irrespective of style or design, firmly united into a unitary structure, together with means for securely but detachably connecting the same to the chassis of an automobile.

The means for connecting the removable unit or shrouding to the chassis is shown in Figures 3, 4 and 8, and specifically illustrated in Figure 5. The transverse members 30 and 31 are each provided with a pair of downwardly open sockets 65 adapted to telescopically receive upwardly extending studs 66 fixedly connected to the frame members of the automobile. Preferably the socket engaging studs are mounted on brackets 68 fixed to the longitudinal frame members 15. The lower ends of the tubular vertical portions 36 of the front frame constitute the sockets of the front transverse frame 30; and the lower ends of the members 48 fixed to the rear member 31 constitute the sockets of said rear member.

As the several sockets and studs, together with the associated clamping means hereinafter described are identical, the description of one is sufficient. Referring particularly to Figure 5, the socket 65 illustrated therein may be the lower end of either of the portions 36 of the front frame or the lower end of one of the elements 48 of the rear frame member 31.

The bracket 68 includes an outwardly extending lug 69 which is perforated to receive the upwardly extending stud 66, and the lower end of the stud is formed with a head 70 engaging the under face of the lug 69 to which it is preferably welded, so that the lug comprises a unitary part of the bracket.

Each clamp comprises a pair of arms 71 pivotally connected to the socket member by a pivot pin 72 extending through said member, a block 73 pivotally mounted between the lower ends of said arms, and a clamp screw 74 threaded through said block and engaging the under face of the stud head 70 to draw the ends of the socket members down over the studs 66 and firmly against the brackets 68.

The arms are preferably outwardly bowed to clear the ends of the bracket lugs 69, and may be connected at their outer edges by an integral yoke portion 75.

The upper end of the screw 74 engages in a socket 76 in the under face of the stud head 70 which socket is outwardly offset from the axis of the socket 65 and lug 69 thereby providing a toggle arrangement which will prevent accidental outward swinging of the arms and consequent loosening of the clamp which may be accomplished after a slight retraction of the screw 74. Any suitable means may be employed to prevent turning of the screw or accidental outward swing of the lower end thereof. In Figure 5 is illustrated a simple means for this purpose which comprises a wire 77 threaded through an aperture 78 in the head of the screw and secured to any adjacent fixed part. As illustrated, the wire may be threaded through an eye 79 in the base of the bracket 68.

When it is desired to get access to the engine and associated parts under the hood or to the front axle assembly, it is but necessary to loosen the four clamp screws 74, swing the arms 71 outwardly, and then lift from the chassis the entire unitary front structure hereinbefore described. After the work is completed the unitary structure may be readily replaced by slipping the sockets 65 over the respective studs 66, and then securing the same in place by the clamps.

In order to be able to remove the front structure it is necessary to electrically disconnect the headlights 82. To this end the leads 83 from the battery to the headlights are provided with any ordinary or preferred separable connections 84 which may be arranged at any convenient location.

Vibration dampeners are provided between the radiator 19 and the adjacent portions of the removable shrouding frame, and between the rear transverse frame member 31 and the dash 18, as illustrated respectively in Figures 9 and 10.

Fixed to the sides of the radiator 19 preferably adjacent the upper end thereof, are brackets 85. These are preferably welded to the radiator and are each provided with an outwardly extending arm 86 having a recess 87 for a cushion 88 which may be of rubber or similar material. An annular washer 89 rests upon the cushion 88, and is held in position by bolts 90 extending through the cushion and threaded into the bottom wall of the recess.

Welded to the frame members 32 adjacent the radiator are arms 92 which extend over the respective arms 86; and threaded through each of said arms 92 is a screw 93 having a downwardly tapering conical head 94 which engages in a central bore 95 in the cushion 88. When installing the device, the screw 93 is adjusted until a firm, non-vibratory connection is attained between the radiator and the frame, and then secured in position by a lock nut 96. After proper initial adjustment no further adjustment is necessary except to compensate for impaction of the cushion.

A single vibration dampener between the frame member 31 and the dashboard 18 is usually sufficient; and is illustrated in Figure 10. As shown therein, the cushion supporting bracket 85' is preferably riveted to the dash 18, and the arm 92' is similarly secured to the frame member 31. Otherwise the construction is substantially the same, and like reference numerals are used for the corresponding elements. Usually but one dampener is required between the frame and the dash-board and this is located centrally of the frame member 31 as indicated in Figure 3.

While I have described a particular form and arrangement of the elements of this invention, it is to be understood that they may be varied to conform to various types and styles of automobiles without departing from the scope of the invention as set forth in the accompanying claims.

I claim:

1. In an automobile construction, a chassis including longitudinal frame members and a dash, a radiator secured to the forward portion of said frame members, a shroud supporting frame comprising transverse end members and longitudinal side members rigidly connecting the same, a hood and front wheel fenders connected solely to said supporting frame, vertically disposed tubular sockets at the lower portions of said transverse members, upwardly extending studs fixed to said chassis frame members and adapted to fit within said sockets, and toggle clamps pivotally mounted on the lower ends of said tubular sockets, the free ends of said clamps engaging beneath said studs detachably securing said shroud supporting frame to said chassis frame members.

2. In an automobile construction, a chassis including longitudinal frame members and a dash, a radiator secured to the forward portion of said frame members, a shroud supporting frame comprising transverse end members and longitudinal side members rigidly connecting the same, said transverse members being arranged slightly forwardly of said dash and said radiator respectively, a hood and front fenders connected solely to said shroud supporting frame, vertically disposed tubular sockets at the lower outer ends of said frame, upwardly extending studs fixed to said chassis frame members and adapted to fit within said tubular sockets, brackets fixed to said dash and said radiator respectively, and extending toward the adjacent portions of the shroud supporting frame, each of said brackets being provided with a resilient cushion member, bracket arms on said shroud supporting frame projecting over the first said brackets, downwardly tapered members on the last said brackets engaging in said cushions respectively, and toggle clamps pivotally mounted on said tubular socket members and engageable under said studs to detachably secure said frame to the chassis.

3. An automobile construction as set forth in claim 2 in which said tapered members are vertically adjustable in the respective brackets.

4. In an automobile construction, a chassis including longitudinal frame members and a dash, a radiator mounted on the forward portion of said frame members, a shroud supporting frame comprising transverse front and rear members and longitudinal side members rigidly connecting the same, a hood and front fenders connected solely to said supporting frame, and splash aprons fixed to said longitudinal side members of said frame, vertical tubular sockets at each side of each of said transverse members, brackets fixed to said chassis frame members and extending beneath the ends of said sockets, studs extending upwardly from said brackets and adapted to telescope within said sockets, and clamping arms pivotally connected to said tubular sockets and means on the free ends of said arms adapted to engage under said studs to detachably clamp said shroud supporting frame to said chassis.

5. In an automobile construction, a chassis including longitudinal frame members and a dash, a radiator fixed to the forward portion of said frame members, in combination with a hood and front wheel fenders, a frame supporting said hood and fenders, said frame comprising a rear transverse member formed of sheet metal with the upper edge thereof shaped to conform to the adjacent portions of said hood and said fenders, and tubular socket members secured vertically to said member with the lower ends thereof adjacent said chassis members, a front frame member formed of tubular stock curved to conform to the adjacent portion of said hood and then extended downwardly at each side and terminating in vertical tubular sockets, and braces between the downwardly extending portions, side members rigidly connecting said front and rear frame members, upwardly extending studs mounted on said chassis members and clamping means connected to each of said sockets and adapted to engage under said studs to detachably secure said supporting frame to said chassis frame members.

6. The combination set forth in claim 5 further characterized by splash aprons fixed to said side members.

7. The combination set forth in claim 5 in which the lower edge of the rear supporting frame is arched between the socket members to span the space between the chassis members as and for the purpose described.

ARTHUR R. NEWELL.

REFERENCES CITED

The following references are of record in the file of this patent:

UNITED STATES PATENTS

| Number | Name | Date |
|---|---|---|
| 1,275,500 | Timmerhoff | Aug. 13, 1918 |
| 1,300,185 | Montgomery | Apr. 8, 1919 |
| 1,343,519 | Motte | June 15, 1920 |
| 1,838,852 | Ledwinka | Dec. 29, 1931 |
| 2,005,103 | Moorhouse | June 18, 1935 |
| 2,128,930 | Fageol et al. | Sept. 6, 1938 |
| 2,303,286 | Lake | Nov. 24, 1942 |
| 2,413,792 | Sharp | Jan. 7, 1947 |
| 2,488,471 | Kramer et al. | Nov. 15, 1949 |

FOREIGN PATENTS

| Number | Country | Date |
|---|---|---|
| 330,452 | Great Britain | June 12, 1930 |
| 388,197 | France | May 25, 1908 |
| 488,492 | Great Britain | July 5, 1938 |